United States Patent [19]

Rodemeyer

[11] 4,082,062

[45] Apr. 4, 1978

[54] INTEGRATED AQUARIUM

[75] Inventor: Donald J. Rodemeyer, City Island, N.Y.

[73] Assignee: Metaframe Corporation, Elmwood Park, N.J.

[21] Appl. No.: 698,556

[22] Filed: Jun. 22, 1976

[51] Int. Cl.² .................................. A01K 64/00
[52] U.S. Cl. ...................................... 119/5
[58] Field of Search .................. 119/5, 3; 210/169

[56] References Cited

U.S. PATENT DOCUMENTS

| | | | |
|---|---|---|---|
| 1,974,068 | 9/1934 | Greensaft | 119/5 |
| 2,002,380 | 5/1935 | Weiriche et al. | 119/5 |
| 2,016,123 | 10/1935 | Schorr | 119/5 |
| 2,808,024 | 10/1957 | Glidden | 119/5 |
| 3,276,428 | 10/1966 | Burch | 119/5 |
| 3,326,185 | 6/1967 | Perez | 119/5 |

*Primary Examiner*—Jay N. Eskovitz
*Attorney, Agent, or Firm*—John M. May; Stephen L. King; Max E. Shirk

[57] ABSTRACT

A novel integrated aquarium is disclosed wherein all of the necessary mechanical functions (air pump, lighting, heating) are located in a compartment provided as part of the aquarium base and those components particularly subject to mechanical failure are mounted in a slide-out drawer provided as part of said base so that they may be more easily repaired or replaced. In the preferred embodiment disclosed, an incandescent light bulb located in said base furnishes both light and heat to the aquarium and is controlled by a thermal sensor with a manual lamp socket over-ride switch provided. To facilitate removal of the air pump for maintenance and possible replacement, the air supply tube leading from the air pump to a sparger/riser tube assembly associated with an undergravel filter is removably connectable to a passageway communicating with said sparger/riser tube by means of a rubber air cup. A one-way check valve is provided as part of said sparger/riser assembly to prevent backflow of water into said compartment. The preferred embodiment disclosed is of an especially pleasing aesthetic hexagonal design and has a thin, unobstructive cover instead of the usual bulky light reflector hood mounted on the aquarium top.

7 Claims, 5 Drawing Figures

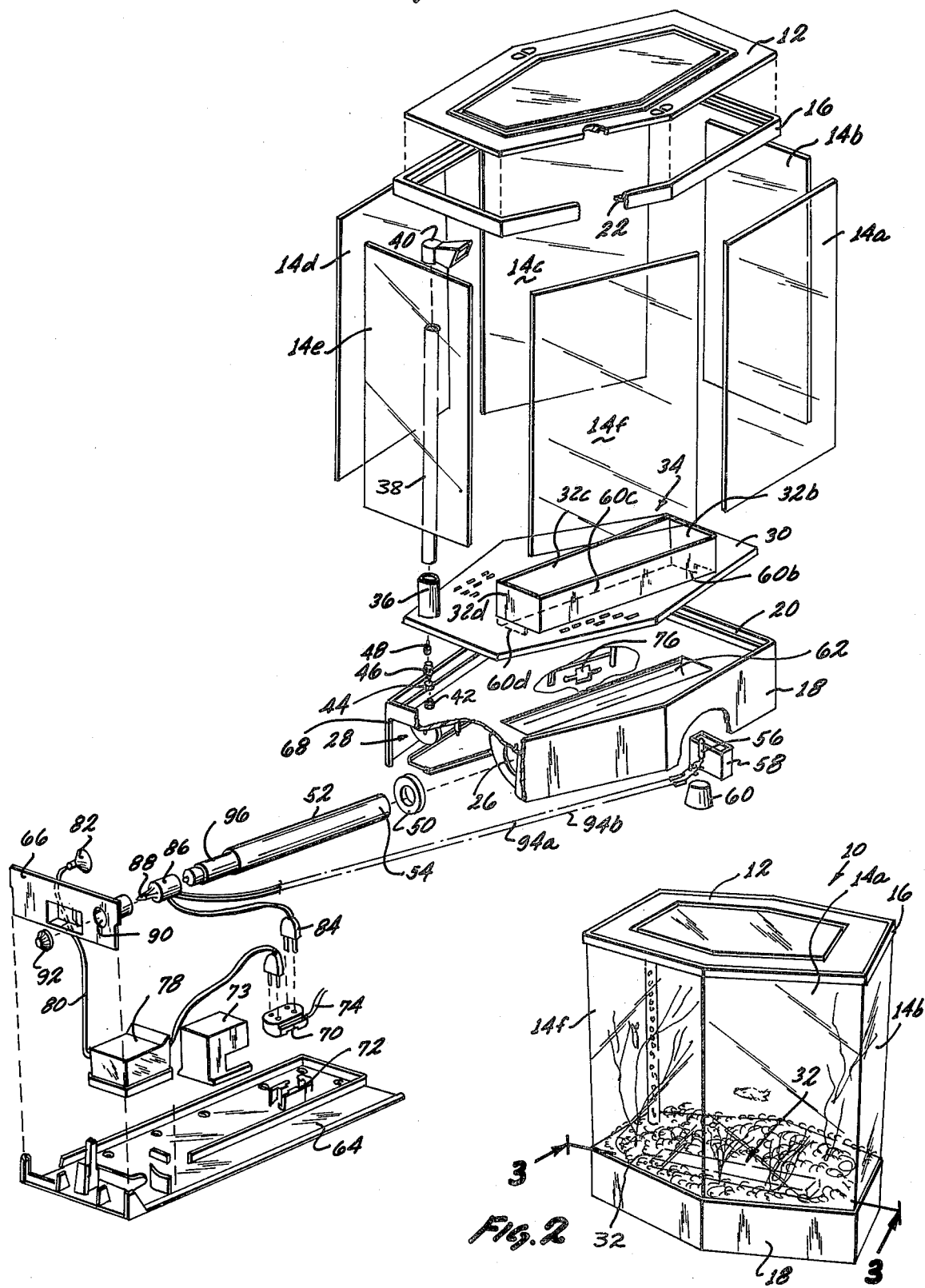

INTEGRATED AQUARIUM

BACKGROUND OF THE INVENTION

The background of the invention will be set forth in two parts.

1. Field of the Invention

The present invention pertains generally to the aquaria art and in particular to aquariums wherein the various required mechanical functions such as filtration, aeration, light, and heat are unobtrusively integrally provided as part of the aquarium structure rather than provided by means of highly visible separate add-on accessories.

2. Description of the Prior Art

For years aquarium hobbyists and aquarium designers have been attempting to enhance the aesthetic effect of their aquaria by hiding to the maximum extent possible the mechanical apparatus associated therewith.

Exemplary of such prior art endeavors are U.S. Pat. Nos. 1,333,454 in the name of M. Sato for an Illuminated Aquarium; 1,974,068 in the name of I. Greensaft for an Illuminated Wall Aquarium; 3,232,271 in the name of G. Dosamentes de Jose, et al for an Integral Unitary Aquarium and 3,292,579 in the name of B. J. Buchanan for an Aquarium Power Supply.

SUMMARY OF THE INVENTION

Accordingly, it is one object of the present invention to provide an integrated aquarium of a modern, aesthetically pleasing design.

It is another object of the present invention to integrate all of the mechanical functions associated with an aquarium with the base component thereof.

It is yet another objective of the present invention to provide an integrated aquarium wherein all of the mechanical elements which may need maintenance or replacement are mounted to a readily removeable drawer chassis arrangement provided as part of the aquarium base, or in the readily removeable riser tube.

It is a specific object of the present invention to connect an air pump providing an air supply to the sparger/riser tube of an undergravel filter in such a way that the air pump may be conveniently disconnected without any resultant backflow of water from the aquarium, even though the air pump is mounted below the water level of the aquarium.

It is another specific object of the present invention to combine lighting and heating functions in one simple unit by means of a suitable automatic or manual electric control.

It is yet another specific object of the present invention to facilitate the replacement of a heating and/or lighting element mounted below waterline easily and without disturbing the contents of the aquarium.

It is still another specific object of the present invention to mount the heater in a location which enhances water circulation and maintenance of even temperatures throughout the aquarium.

It is an overall object of the present invention to provide an integrated aquarium design which is relatively inexpensive to manufacture and simple to use and maintain.

The invention which achieves these and other objects, as will become more clear from the detailed description which follows, may be briefly summarized as follows:

A modified undergravel filter arrangement may be provided in the lower portion of a water containing housing having a base, at least one transparent side and reflective cover. The modified undergravel filter may be provided with a riser/sparger tube communicating with an air passageway provided in said base and equipped with a check valve. The modified undergravel filter may also have a gravel barrier defining an open area free from gravel or other decorative and/or filtration material.

In the base portion below said water containing housing, there may be provided in the area of said air passageway means for removably connecting the output from a suitable air pump and near the bottom of said open area there may be provided (within transparent water-tight housing) an externally accessible light source.

An integrated aquarium in accordance with the present invention may also be provided with a thermal sensing element which controls a heating element which, in a preferred embodiment, is an incandescent light bulb provided as part of said light source.

BRIEF DESCRIPTION OF THE DRAWINGS

The present invention may be better understood by reference to the detailed description which follows and the appended drawings in which:

FIG. 1 represents an exploded partially cut-away view of a preferred embodiment of the integrated aquarium of the present invention;

FIG. 2 shows such an integrated aquarium assembled and in use;

DETAILED DESCRIPTION OF A PREFERRED EMBODIMENT

Figure 3:
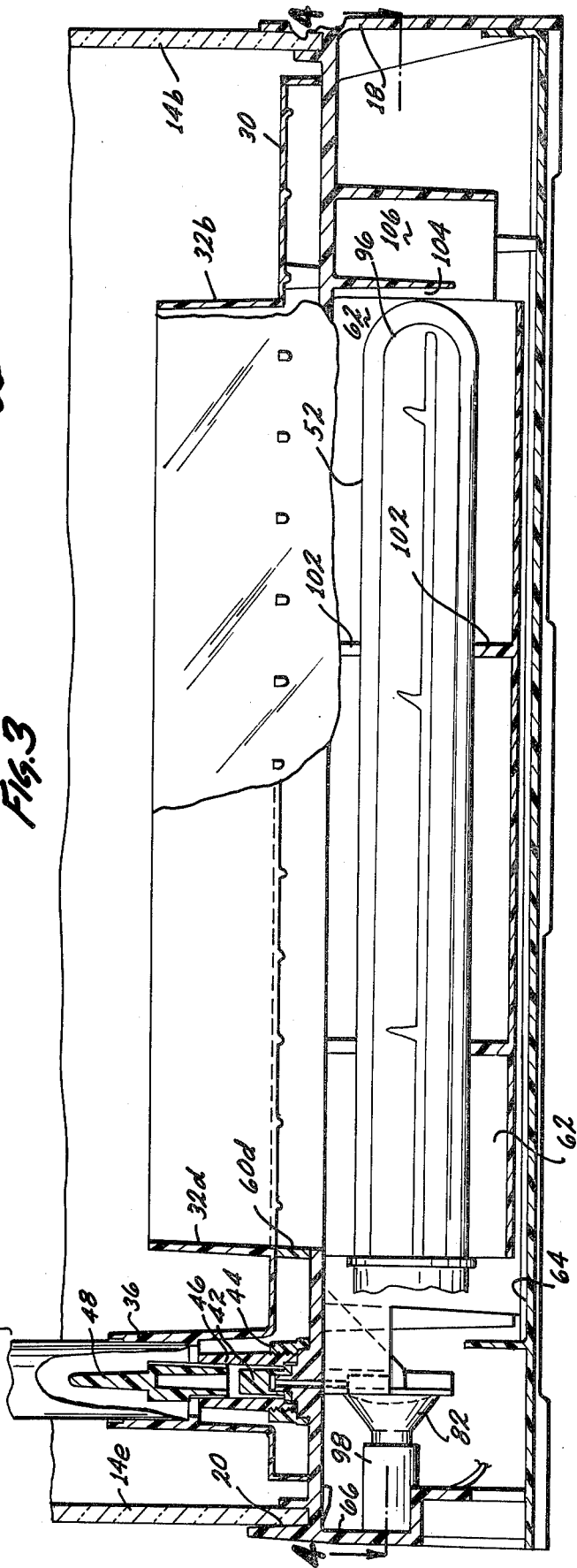
FIG. 3 is a vertical partially cut-away cross-sectional view of the assembled aquarium of FIG. 2 as indicated.

Referring now specifically to FIGS. 1 and 2, showing the integrated aquarium of the present invention in exploded and assembled views, respectively, it may be seen that aquarium 10 comprises a molded plastic top cover 12, having a white or other reflective lower surface, and transparent sidewalls 14a through 14f. In the embodiment illustrated, it is noted that the sidewalls comprise six separate sheets of glass, all of which are transparent and are arranged in a hexagonal arrangement. However, other arrangements utilizing curved transparent walls and/or one or more opaque panels, and arrangements having more or less than six sides are possible without departing from the spirit of the present invention.

The aquarium walls are mounted between an upper molded plastic frame 16 and a molded plastic base 18. Walls 14, top frame 16, and base 18 are mounted together using a suitable joining compound such as silicon sealant, and top frame 16 as well as base 18 may have integrally molded therewith suitable grooves 20 and 22, respectively, to more securely hold the vertical walls in place.

The completed assembly of top frame 16, walls 14 and base 18 forms a water-tight aquarium housing, although it is to be noted that base 18 is provided with an air passageway 24 and a light heating element opening 26 which both communicate to a lower region 28 provided beneath and as an integral part of base 18. However, these passageways and openings are made water-tight by means which will become more clear hereinafter.

Provided within the water-tight housing is a modified undergravel filter plate 30 provided with gravel retention barriers 32a, b, c, and d, which define an open area 34. Although open area 34 in the embodiment illustrated is rectangular in shape, defined by four flat vertical walls, it should be noted that other shapes and sizes of open areas defined by suitable gravel barriers may be utilized without departing from the spirit of the present invention. Filter plate 30 is provided with a tubular projection 36 into which a riser tube of appropriate length 38 together with deflector 40 may be mounted. Tubular projection 36 is located on filter plate 30, such that it is immediately above the upper end of air passageway 24. Air passageway 24 is provided with a check valve 42 located within a sparger assembly fastened by a mounting nut 44 cemented to base 18 in the region surrounding the upper end of air passageway 24 (although it should be noted that it could also be molded integrally with said base). A sparger outer body 46, screwably insertable (to permit cleaning and/or replacement) into said sparger nut, and a sparger body inner portion 48 pressed into said sparger body outer portion are additionally provided, whereby air arriving up through air passageway 24 is broken into a stream of bubbles which may arise through riser tube 38.

The operation of the undergravel filter of the present invention is conventional except for the provision of said open area 34 and will not be described in detail. However, it has been found that the efficiency of the undergravel filter may be enhanced by the provision of a carbon cartridge on the upper side of the undergravel plate, but below the bulk of the gravel or other filtration medium utilized.

The aforementioned light opening 26 is provided with a thermo-plastic rubber seal 50 through which light tube 52 is inserted. Inasmuch as light tube 52 is closed at end 54 furthest removed from the aforesaid opening 26, it may be seen that once the seal and light tube are in place (utilizing, if necessary, a suitable jointing compound), that no water may leak from the body of the aquarium housing into the region 28 below the base through opening 26. Light tube 52 is preferably made of high impact strength material, such as polycarbonate plastic sold by GE under its LEXAN trademark. Obviously, fracture of the light tube would be highly undesireable inasmuch as it would result in leaks and possible electrical hazards.

Referring now to FIG. 1 in conjunction with FIG. 3, it may be seen that gravel barriers 32b, 32c, and 32d, have downward projections 60b, 60c, and 60d, respectively, the purpose of which is to prevent unfiltered water located within the open area defined by said gravel barrier and the semi-cyclindrical recess in base 18 immediately below said area from directly flowing beneath filter plate 30 and rising up riser tube 38, inasmuch as the water located within said area is unfiltered; otherwise, the filtration efficiency of undergravel filter 30 would be diminished.

Alternatively, in another embodiment of the present invention not specifically shown in the drawings, lower projectiong portions 60b, 60c, and 60d may be dispensed with and in their place a cover plate or lens provided over the gravel barrier walls 32 a through 32d, thus ensuring that the water surrounding light tube 52 is filtered water that already has passed through the gravel or other filtration medium placed over filter plate 30.

In this regard, it has been found that the provision of a cover plate or lens over the gravel barrier encourages the growth of algae on light tube 52, thereby limiting the efficiency of the lighting function, and unless the cover plate is made removeable, such algae cannot be cleaned off without emptying the aquarium and removing the aquarium's contents, including filter plate 30.

Referring now specifically to the lower portion of FIG. 1 wherein it may be seen that base 18 is provided with a slideout drawer chassis 64, having a drawer front 66 affixed at one end thereof, the drawer chassis assembly is slideably removeable from an opening 68 provided at one end of base 18.

Conveniently mounted to drawer chassis 64 is a standard female double receptacle 70 mounted to an appropriately shaped arrangement 72 integrally molded into chassis 64. A removeable transparent splash guard 73 may be provided over receptacle 70 in the interest of safety. Emminating from receptacle 70 are a pair of wires 74 which lead through a strain relief provided opening 76 at the back side of base 18 and which are terminated in a standard wall plug (not shown). Sufficient slack is provided in wires 74 to permit drawer chassis 64 to be removed for almost its entire length from base 18, a suitable stopper arrangement (now shown) being provided to prevent its being removed altogether. Connected to receptacle 70 is air pump 78, which may be a pump of the type sold by the Metaframe Corporation under its Hush I trademark, having an air outlet tube 80 terminating in an air cup 82, the details of which better shown in FIG. 3. When the drawer chassis is in place, air cup 82 makes air tight contact with the external end of air passage 24 molded into the base. Also, plugged into receptacle 74 is a standard electrical plug 84 connected to a standard lamp socket 86 provided with a switch 88 at one end thereof. Socket 86 is mounted to a suitably shaped mounting arrangement 90 provided as part of drawer front 66 and switch 88 is terminated by an indicator knob 92.

The aforementioned thermal sensor 56 is also connected to switch 86 by means of wires 94a and 94b such that, even if switch 88 located on receptacle 86 is in its "off" position, thermal sensor 56 serves as an automatic override turning on lamp 96 for a sufficient length of time to maintain the water in the aquarium at an appropriate tropical termpature; conversely, switch 88 in its "on" position serves as a manual override turning on lamp 96 for the purpose of illuminating the aquarium even if thermal sensor 56 sensor that the water is sufficiently warm.

It has been found that if thermal sensor 56 is designed such that it cuts in at 72° and cuts out at 75° and if incandescent bulb 96 is of 60 or 75 watts, then for an aquarium having an approximate capacity of 10 gallons, the water will be maintained within a temperature range suited for the majority of tropical fish, and lamp 96 may be left turned on by the user for prolonged periods of time, say 6 to 8 hours, without the water temperature rising beyond 80°.

Thus, it may be seen that by this arrangement, an incandescent lamp 96 contained within lamp tube 52 located in recess 62 of base 18 at the lower region of open area 34 serves not only to light the aquarium but also to maintain it within an appropriate temperature range.

As has been noted previously, the underneath of top cover 12 is highly reflective, thus redirecting the light radiating upwards from incandescent bulb back down into the water of the aquarium, thereby improving the efficiency and the aesthetic and dramatic effect of the lighting which is particularly important with such tropical fish as have highly irridescent bodies such as Rosy Barbs, and is also very effective with fish having relatively transparent bodies such as Glass Catfish.

Figure 5:
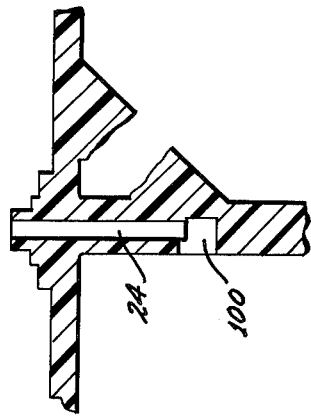
FIG. 5 is an enlarged cross-sectional view of the air passageway containing a portion of the aquarium base shown in FIG. 3 with the sparger/riser assembly not yet mounted.

Referring now particularly to FIG. 3, it may be seen that air cup 82 is mounted in a suitable projection 98 provided as part of drawer front 66 such that when the drawer is slid into its closed position, air cup 82 makes air tight connection with the region surrounding the lower opening 100 associated with air passageway 24 (see also FIG. 5). It may also be seen that the semi-cylindrical recess 62 located below the open area defined by gravel barrier 32 is provided with one or more light supports 102 which serves to locate light tube 52.

Also visible in FIG. 3 is a region 104 immediately adjacent said recess in which thermal sensor 56 may be enplaced, as well as region 106 wherein thermal insulator 58 is located. If thermal sensor 56 takes the form of a conventional bi-metalic aquarium thermostat, then obviously a larger region is required, and may be located towards the back of the aquarium in a location free from other mechanical components.

Figure 4:
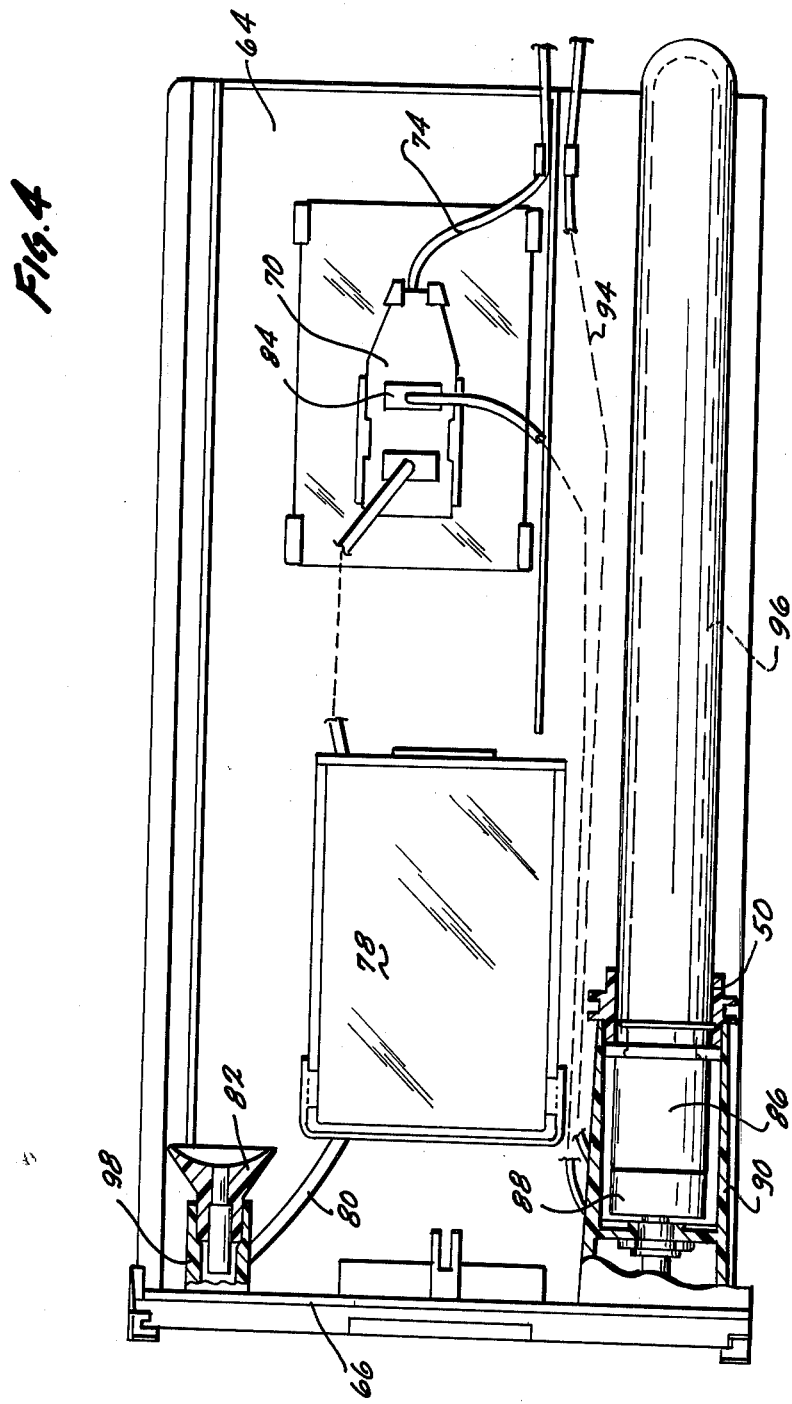
FIG. 4 is a plan view partially in cross-section at the point indicated on FIG. 3 of the assembled drawer shown in the lower portion of FIG. 1.

FIG. 4 is a top view of the drawer assembly shown in exploded view of the bottom portion of FIG. 1 and shows the relative location of air pump 78, receptacle 70, air cup 82, socket 86, and light bulb 96 with respect to said drawer, and furthermore illustrates how all of these elements may be simultaneously removed from the underneath portion 28 of base 18 when said drawer is slid out.

Obviously, once the drawer is slid out, it is a relatively simple matter to replace light bulb 96 or even to remove or repair air pump 78, an operation that merely requires unplugging the electrical lead emitting from receptacel 70 and removing air line 80 from the pump, whereupon it may be altogether lifted out.

If need be, it is even possible to repair or replace socket 90 and its associated wiring without difficulty and without disturbing the contents fo the aquarium.

While the foregoing invention has been described with particular reference to a preferred embodiment thereof which particularly takes advantage of the aesthetic advantages inherent in the present invention without requiring any costly components, nevertheless, it will be appreciated that the invention has many other applications in the integrated aquarium art and many variations are possible which exploit one or more novel and inventive aspects of the preferred embodiment.

What is claimed is:

1. A frameless integrated aquarium comprising:
   a molded base defining a lower portion of a water containing region, said base being integrally provided with electrical means for heating, illuminating, and circulating the water contained in said water containing region;
   a plurality of transparent vertical side walls further defining said water containing region, said side walls being secured in part by integrally molded grooves provided as part of said molded base;
   a molded top frame having defined on the lower surfaces therof integrally molded grooves for further securing said side walls; and
   a false bottom removably located at the lower portion of the water containing region defined by said base and said side walls, said false bottom comprising:
   a vertically upstanding gravel barrier for permitting a light source located below said false bottom to project light into the interior of said water containing region above said false bottom, and
   a riser tube for permitting water to circulate upwards from the region below said false bottom, wherein at least a portion of said false bottom functions as an undergravel filter plate.

2. The integrated aquarium of claim 1 wherein said lighting means comprises an incandescent light bulb of generally tubular construction located in the portion of said base below said gravel barrier provided as part of said false bottom when said false bottom is in place inside said aquarium.

3. The integrated aquarium of claim 1 further comprising a top cover removably located above said top frame.

4. The integrated aquarium of claim 3 wherein said top cover has a lower reflective surface.

5. The integrated aquarium of claim 1 wherein said heating means is located within a water containing trough integrally molded in said base below said false bottom.

6. The integrated aquarium of claim 5 wherein said heating means is thermostatically controlled.

7. The integrated aquarium of claim 1 wherein said riser tube is provided with an output deflector at approximately water level.

* * * * *